United States Patent [19]

Morimoto et al.

[11] Patent Number: 4,831,499

[45] Date of Patent: May 16, 1989

[54] ELECTROLYTIC CAPACITOR

[75] Inventors: Takeshi Morimoto; Yoshiki Hamatani; Masaru Yoshitake; Hidemi Yamada, all of Yokohama, Japan

[73] Assignees: Asahi Glass Company Ltd., Tokyo; Elna Company Ltd., Fujisawa, both of Japan

[21] Appl. No.: 219,194

[22] Filed: Jul. 15, 1988

[30] Foreign Application Priority Data

Jul. 17, 1987 [JP] Japan ................... 62-177212

[51] Int. Cl.$^4$ ............................. H01G 9/02
[52] U.S. Cl. ..................... 361/806; 252/62.2
[58] Field of Search ................. 252/62.2; 361/433 E

[56] References Cited

U.S. PATENT DOCUMENTS 2,071,103  2/1937  Bergstein ..................... 175/315
2,153,999  4/1939  Waterman ..................... 175/315
4,447,346  5/1984  MacNamee et al. ............. 252/62.2
4,715,976  12/1987  Mori et al. .................. 252/62.2
4,774,011  9/1988  Mori et al. .................. 361/433 X

FOREIGN PATENT DOCUMENTS 0227433  7/1987  European Pat. Off. .
51-46252  12/1976  Japan .
2041646A  9/1980  United Kingdom .

Primary Examiner—Donald A. Griffin
Attorney, Agent, or Firm—Oblon, Fisher, Spivak, McClelland & Maier

[57] ABSTRACT

An electrolytic capacitor comprising a capacitor element and an electrolyte impregnated to the element, wherein the electrolyte comprises a reaction product of citraconic acid with trialkylamine dissolved in a solvent selected from the group consisting of lactones, glycols and mixtures thereof.

8 Claims, No Drawings

ELECTROLYTIC CAPACITOR

The present invention relates to an electrolytic capacitor wherein a novel electrolyte is used.

An electrolytic capacitor having a capacitor element prepared by rolling foils of a valve metal such as aluminum together with a separator, usually has a structure wherein an electrolyte is impregnated to the capacitor element, and such a capacitor element is accomodated and sealed in a metal casing such as an aluminum casing or in a casing made of a synthetic resin.

It has been common to employ, as an electrolyte for the electrolytic capacitor, an electrolyte obtained by dissolving as a solute a salt not corrosive to metal electrodes, such as an ammonium salt of an organic acid, in a solvent composed mainly of e.g. ethylene glycol. (See e.g. Japanese Examined Patent Publication No. 13019/1983.)

However, with the above electrolyte, it is common to add from 1 to 30% by weight of water in order to increase the electrical conductivity. In such a case, there have been drawbacks such that due to the corrosion of a cathode foil or due to evaporation of dissociated ammonia ($NH_3$), deterioration of the properties at high temperatures is substantial, especially the tangent of loss angle is large, and leakage current after being left at high temperatures without load is substantial. With these drawbacks, the electrolytic capacitor used to be inferior in the high frequency characteristics to other capacitors such as ceramic capacitors, although it is excellent in other properties.

Heretofore, a few types of electrolytes are known as electrolytes having relatively low specific resistance. For example, an electrolyte is known which comprises ammonium adipate, ethylene glycol and water.

Further, an electrolytic capacitor is known wherein a quaternary ammonium salt of an unsaturated dicarboxylic acid is used. However, it has a drawback that with this electrolyte, it is impossible to prepare a prescribed 100 V product, although the electrical conductivity is high. (Japanese Unexamined Patent Publication No. 276815/1987)

An electrolyte obtained by dissolving an acidic salt (mono salt) of citraconic acid in N-methylformamide has been proposed (Japanese Examined Patent Publication No. 46252/1976). However, only potassium citraconate is disclosed as the acidic salt of citraconic acid, and this citraconate is poor in the durability, and the aluminum foil is likely to be thereby corroded.

It is an object of the present invention to provide a prescribed 100 V electrolytic capacitor having excellent high frequency characteristics by using an electrolyte having excellent high temperature stability and low specific resistance i.e. high electrical conductivity to lower the impedance.

The present invention provides an electrolytic capacitor comprising a capacitor element and an electrolyte impregnated to the element, wherein the electrolyte comprises a reaction product of citraconic acid with a trialkylamine dissolved in a solvent selected from the group consisting of lactones, glycols and mixtures thereof.

Now, the present invention will be described in detail with reference to the preferred embodiments.

The trialkylamine which may be used in the present invention includes trimethylamine, triethylamine, tripropylamine, diethylamine. Among them, triethylamine is particularly preferred, since it is thereby possible to obtain high electrical conductivity.

The lactones include $\beta$-butyrolactone, $\gamma$-butyrolactone, $\gamma$-valerolactone, $\delta$-valerolactone, $\gamma$-caprolactone, $\epsilon$-caprolactone, $\gamma$-heptalactone, $\gamma$-hydroxy-n-caprylic lactone, $\gamma$-nonalactone, $\delta$-nonalactone, $\delta$-decalactone and $\gamma$-undecalactone.

The glycols include ethylene glycol, an ethylene glycol monoalkyl ether, an ethylene glycol dialkyl ether, propylene glycol, diethylene glycol, a diethylene glycol monoalkyl ether, a diethylene glycol dialkyl ether, a polyethylene glycol and glycerol.

The content of the reaction product, especially mono salt, of citraconic acid with a trialkylamine in the solvent may be selected within a wide range. However, the specific resistance is minimum when the electrolyte is in the state of a saturated solution. The content (concentration) of the reaction product of citraconic acid with a trialkylamine is usually from 0.5 to 80% by weight, preferably from 1 to 50% by weight, in the electrolyte.

The lactones and glycols may be used alone. However, higher electrical conductivity can be obtained when the lactones and glycols are used in combination as a mixture. The ratio of glycols/lactones is usually within a range of from 80/20 to 5/95, preferably from 40/60 to 20/80.

In the present invention, it is also possible to add an inorganic acid such as boric acid, phosphoric acid, tangstic acid or a polyacid, or its salt, or a polysaccharide such as mannitol or sorbitol in an amount of from 0.1 to 10% by weight, preferably from 0.1 to 5% by weight, to improve the sparking voltage.

The pH of the electrolyte is adjusted usually at a level of from 4 to 12, preferably from 5 to 7, if necessary, by adding a suitable pH controlling agent.

The presence of water should be as little as possible, since it causes corrosion of the aluminum foil. However, water content of less than 5% by weight does not substantially bring about any particular problem.

The electrolytic capacitor of the present invention includes various types of capacitors. In a typical type, an aluminum foil anode and an aluminum foil cathode separated by a suitable separator such as paper, are used, and they are rolled into a cylindrical shape to obtain a capacitor element, and an electrolyte is impregnated to this capacitor element. The amount of the impregnated electrolyte is preferably from 50 to 300% by weight relative to the separator. The capacitor element impregnated with the electrolyte is accomodated and sealed in a casing made of a corrosion resistant metal such as aluminum or of a synthetic resin.

Now, the present invention will be described in further detail with reference to Examples. However, it should be understood that the present invention is by no means restricted to these specific Examples, and various changes or modifications may be made within the scope of the present invention.

EXAMPLES 1 to 13 and COMPARATIVE EXAMPLES 1 to 4

In Table 1, Examples wherein citraconic acid or its trialkylamine salt is used are shown together with Comparative Examples.

By using various electrolytes having the compositions as identified in Table 1, twenty electrolytic capacitors (100 V-680 $\mu$F) with an electrolode made of an aluminum foil were prepared for each electrolyte. These capacitors were subjected to ultrasonic cleaning at 50° C. for 15 minutes by using trichlene. Then, the capacitors were subjected to the life tests at 105° C. The tangent of loss angle thereby obtained is shown in Table 1 together with the results of the Comparative Examples. The value for the tangent of loss angle is an average value of twenty capacitors.

TABLE 1

|  | Composition of electrolyte (% by weight) |  | Tangent of loss angle Initial | After 1000 hrs at 105° C. |
|---|---|---|---|---|
| Example 1 | Monotrimethylamine salt of citraconic acid | (5) | 0.029 | 0.033 |
|  | γ-Butyrolactone | (35) |  |  |
|  | Ethylene glycol | (60) |  |  |
| Example 2 | Citraconic acid | (10) | 0.025 | 0.031 |
|  | Triethylamine | (8) |  |  |
|  | γ-Butyrolactone | (70) |  |  |
|  | Ethylene glycol | (12) |  |  |
| Example 3 | Citraconic acid | (10) | 0.028 | 0.034 |
|  | Triethylamine | (8) |  |  |
|  | Boric acid | (2) |  |  |
|  | Mannitol | (3) |  |  |
|  | γ-Butyrolactone | (42) |  |  |
|  | Ethylene glycol | (35) |  |  |
| Example 4 | Citraconic acid | (10) | 0.026 | 0.030 |
|  | Triethylamine | (8) |  |  |
|  | Silicotungstic acid | (2) |  |  |
|  | γ-Butyrolactone | (48) |  |  |
|  | Ethylene glycol | (32) |  |  |
| Example 5 | Citraconic acid | (10) | 0.026 | 0.031 |
|  | Triethylamine | (8) |  |  |
|  | Ammonium phosphate | (0.2) |  |  |
|  | γ-Butyrolactone | (64) |  |  |
|  | Ethylene glycol | (17.8) |  |  |
| Example 6 | Citraconic acid | (10) | 0.024 | 0.030 |
|  | Triethylamine | (8) |  |  |
|  | Metatungstic acid | (2) |  |  |
|  | γ-Butyrolactone | (64) |  |  |
|  | Ethylene glycol | (16) |  |  |
| Example 7 | Citraconic acid | (10) | 0.025 | 0.031 |
|  | Triethylamine | (8) |  |  |
|  | β-Butyrolactone | (70) |  |  |
|  | Ethylene glycol | (12) |  |  |
| Example 8 | Citraconic acid | (10) | 0.025 | 0.030 |
|  | Triethylamine | (8) |  |  |
|  | γ-Valerolactone | (70) |  |  |
|  | Ethylene glycol | (12) |  |  |
| Example 9 | Citraconic acid | (10) | 0.025 | 0.031 |
|  | Triethylamine | (8) |  |  |
|  | δ-Valerolactone | (70) |  |  |
|  | Ethylene glycol | (12) |  |  |
| Example 10 | Citraconic acid | (10) | 0.028 | 0.036 |
|  | Triethylamine | (8) |  |  |
|  | γ-Butyrolactone | (70) |  |  |
|  | Diethylene glycol | (12) |  |  |
| Example 11 | Citraconic acid | (10) | 0.027 | 0.035 |
|  | Triethylamine | (8) |  |  |
|  | γ-Butyrolactone | (70) |  |  |
|  | Propylene glycol | (12) |  |  |
| Example 12 | Citraconic acid | (10) | 0.030 | 0.038 |
|  | Triethylamine | (8) |  |  |
|  | γ-Butyrolactone | (77) |  |  |
|  | Polyethylene glycol | (5) |  |  |
| Example 13 | Citraconic acid | (10) | 0.029 | 0.036 |
|  | Triethylamine | (8) |  |  |
|  | γ-Butyrolactone | (77) |  |  |
|  | Glycerol | (5) |  |  |
| Comparative Example 1 | Monoammonium adipate | (10) | 0.033 | All corroded Not measurable |
|  | Ethylene glycol | (90) |  |  |
| Comparative Example 2 | Monotetraethylammonium citraconate | (20) | Sparking voltage was too low for capacitor |  |
|  | γ-Butyrolactone | (80) |  |  |
| Comparative Example 3 | Monopotassium citraconate | (9) | 0.025 | All corroded Not measurable |
|  | N—methlyformamide | (91) |  |  |
| Comparative Example 4 | Monopotassium citraconate | (18) | Sparking voltage was too low for capacitor |  |
|  | γ-Butyrolactone | (70) |  |  |
|  | Ethylene glycol | (12) |  |  |

We claim:

1. An electrolytic capacitor comprising a capacitor element and an electrolyte impregnated to the element, wherein the electrolyte comprises a reaction product of citraconic acid with a trialkylamine dissolved in a solvent selected from the group consisting of lactones, glycols and mixtures thereof.

2. The electrolytic capacitor according to claim 1, wherein the trialkylamine is trimethylamine or triethylamine.

3. The electrolytic capacitor according to claim 1, wherein the lactones are β-butyrolactone, γ-butyrolactone, γ-valerolactone, δ-valerolactone, γ-caprolactone, ε-caprolactone, γ-heptalactone, γ-hydroxy-n-caprylic lactone, γ-nonalactone, δ-nonalactone, δ-decalactone and γ-undecalactone.

4. The electrolytic capacitor according to claim 1, wherein the glycols are ethylene glycol, an ethylene glycol monoalkyl ether, an ethylene glycol dialkyl ether, propylene glycol, diethylene glycol, a diethylene glycol monoalkyl ether, a diethylene glycol dialkyl ether, a polyethylene glycol and glycerol.

5. The electrolytic capacitor according to claim 1, wherein the solvent is a mixture of glycols/lactones within a range of from 80/20 to 5/95.

6. The electrolytic capacitor according to claim 1, wherein the electrolyte contains from 0.1 to 10% by weight of an inorganic acid or its salt, or a polysaccharide.

7. The electrolytic capacitor according to claim 1, wherein the electrolyte has a pH of from 5 to 7.

8. The electrolytic capacitor according to claim 1, wherein the electrolyte has a water content of less than 5% by weight.

* * * * *